United States Patent
Bade et al.

(10) Patent No.: US 7,143,287 B2
(45) Date of Patent: Nov. 28, 2006

(54) METHOD AND SYSTEM FOR VERIFYING BINDING OF AN INITIAL TRUSTED DEVICE TO A SECURED PROCESSING SYSTEM

(75) Inventors: Steven A. Bade, Georgetown, TX (US); David Carroll Challener, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 10/970,461

(22) Filed: Oct. 21, 2004

(65) Prior Publication Data

US 2006/0090070 A1    Apr. 27, 2006

(51) Int. Cl.
   *G06F 17/30*    (2006.01)
(52) U.S. Cl. .................. 713/164; 713/150; 713/168
(58) Field of Classification Search ............... 713/168, 713/164, 150
   See application file for complete search history.

(56) References Cited

U.S. PATENT DOCUMENTS

| 2003/0056109 A1 | 3/2003 | Elliot et al. |
| 2003/0115453 A1 | 6/2003 | Grawrok |
| 2003/0188162 A1 | 10/2003 | Candelore et al. |
| 2003/0226040 A1 | 12/2003 | Challener et al. |

FOREIGN PATENT DOCUMENTS

EP    1076279 A    2/2001

WO    WO014/52234 A    7/2001

OTHER PUBLICATIONS

Allocation and binding during fault-secure microarchitecture synthesis; Sokolov, S.; Karri, R.; Computer Design: VLSI in Computers and Processors, 1994. ICCD '94. Proceedings., IEEE International Conference on Oct. 10-12, 1994 pp. 327-330.*
Local key exchange for mobile IPv6 local binding security association; Changwen Liu; Soliman, H.; Vehicular Technology Conference, 2004. VTC 2004-Spring. 2004 IEEE 59th vol. 5, May 17-19, 2004 pp. 2647-2655 vol. 5.*
Composition trust bindings in pervasive computing service composition; Buford, J.; Kumar, R.; Perkins, G.; Pervasive Computing and Communications Workshops, 2006. PerCom Workshops 2006. Fourth Annual IEEE International Conference on; Mar. 13-17, 2006 p. 6 pp.*

(Continued)

*Primary Examiner*—David Jung
(74) *Attorney, Agent, or Firm*—Mitch Harris, Atty at Law, LLC; Andrew M. Harris; Casimer K. Salys

(57) ABSTRACT

A method and system for verifying binding of an initial trusted device to a secured processing system binds an initial device or replacement when no binding information is available from another device in the system. A platform credential is issued only when a valid binding is verified, by sending a proof of binding to a credential provider, such as the manufacturer. The method secures against security breaches that can occur when a device is removed from the system during the binding process. The binding information is generated in the device upon installation and includes system identification information so that at each initialization, upon return of binding information from the system to the device, the device can ensure that it is installed in the proper system and abort operation if the system does not match.

25 Claims, 5 Drawing Sheets

OTHER PUBLICATIONS

U.S. Appl. No. 10/835,503, filed Apr. 29, 2004, Bade et al.
U.S. Appl. No. 10/835,498, filed Apr. 29, 2004, Bade et al.
U.S. Appl. No. 10/835,350, filed Apr. 29, 2004, Bade et al.
U.S. Appl. No. 10/835,330, filed Apr. 29, 2004, Bade et al.
Puttegowda, et al., "RSA encryption using extended modular arithmetic on the Quicksilver COSM adaptive computing machine", Field-Programmable Custom Computing Machines, 2003. FCCM 2003. 11th Annual IEEE Symposium on Apr. 9-11, 2003, pp. 305-307.
Al-Muhtadi, et al. "Context and Location-Aware Encyption for Pervasive Computing Environments", Pervasive Computing and Communications Workshops, 2006. PerCom Workshops 2006. Fourth Annual IEEE International Conference on Mar. 13-17, 2006 pp. 289-289.
Chew, et al. "IAuth: An authentication system for internet applications", Computer Software and Applications Conference, 1997, COMPSAC '97 Proceedings, The Twenty-First Annual International Aug. 13-15, 1997, pp. 654-659.

* cited by examiner

METHOD AND SYSTEM FOR VERIFYING BINDING OF AN INITIAL TRUSTED DEVICE TO A SECURED PROCESSING SYSTEM

CROSS-REFERENCE TO RELATED APPLICATIONS

The present application is related to co-pending U.S. patent application Ser. No. 10/970,459, entitled "METHOD AND SYSTEM FOR BACKUP AND RESTORE OF A CONTEXT ENCRYPTION KEY FOR A TRUSTED DEVICE WITHIN A SECURED PROCESSING SYSTEM", filed concurrently with the present application. The specification of the above-referenced Patent Application is herein incorporated by reference.

BACKGROUND OF THE INVENTION

1. Technical Field

The present invention relates generally to security in processing systems, and more particularly, to a methodology for installing binding information into an initial or replacement trusted device in a secured processing system.

2. Description of the Related Art

Present-day computing systems, and in particular large-scale server systems, often include support for running multiple virtual machines. The system may be a large-scale on-demand server system that executes hundreds of server instances on a single hardware platform to support customers with varying computing requirements. In the most flexible of these systems, multiple partitions, which may differ in operating system and application mix, are concurrently present in system memory and processes executing in each partition are run in an environment that supports their execution on a guest operating system. The virtual machine provides an environment similar enough to a real hardware platform that the operating system can run with little or no modification. A hypervisor (sometimes referred to as a virtual machine monitor) manages all of the virtual machines or partitions and abstracts system resources so that each partition provides a machine-like environment to each operating system instance.

To implement the above architectural goals, multiple processing modules and other devices are installed in a system, and each device generally supports one or more of the above-described partitions, although it is possible to share tasking on a partition between multiple devices. Groups of devices or an individual device may be associated with a particular customer and it is desirable to secure access to a device or group by only that customer including securing the devices from the manufacturer of the devices and system.

In order to provide security in such a system, devices must be bound to the system, avoiding removal and data mining that can occur by either extracting data from a device, or using a device to "impersonate" a system or portion thereof, from which it was extracted. Binding can be physical, i.e., the device is permanently attached to the system, or binding can be accomplished cryptographically, allowing for removable devices and networked systems. A platform credential is issued to a system (or particular trusted groups of devices within a system) only when the credential provider is certain that a trusted device has been validly bound to the system. The credential certifies that the platform embodies one or more trusted devices and therefore has the attributes associated therewith. Typically the certification is performed at the manufacturers site and the trusted devices are either permanently physically bound to the system, or are cryptographically bound to the system without possibility of field replacement.

The above-mentioned removable and networked devices provide protection from data tampering or impersonation by refusing to initiate in a system unless the device is crytographically bound to the system. The information associated with the binding is generally encrypted and is stored in non-volatile storage within the device by the manufacturer. With the above-described mechanism, only a trusted system can access data associated with or stored within a particular device, dramatically reducing the impact of misappropriation or misuse of removable devices. Further, data associated with a device (such as a stored context or "state" of one of the above-mentioned virtual machines) is secured by an encryption mechanism that requires a key that is stored within the associated device or devices. The two-layer mechanism: hardware binding and data encryption keyed to a particular device or devices provides a high level of security against data mining by misappropriation or misuse of removable devices.

When one of the devices fails or at initial installation of a trusted device into a system, the new device must be bound to the system in order for the device to initialize according to the above-described security methodology. If other devices having the desired security binding are present and operational in the system, binding information can be transferred from one of the other devices. However, if no other device is available with the desired binding, i.e., the last device with that binding has failed or only one such device was present in the system originally, then it is necessary for the binding to be established by other means, typically by returning the system to the manufacturer.

Field replacement mechanisms for replacing a trusted device cause potential exposure of the system to unauthorized or modified hardware. Therefore, it is desirable that the replacement techniques be at least as secure as the operational security scheme, again typically requiring return of the device to the manufacturer.

One method of attacking a system with bound devices is to remove a device during the binding process or otherwise rendering a device "unbound" and attempting to install the device on another system. Also, failure could occur during the binding process that may compromise the integrity of the system by causing a device to appear to be secured to a particular platform when it is not.

Therefore, it would be desirable to provide a field-replacement mechanism for binding replacement devices to a system in a secure manner when no other device with the desired binding is present in the system. It would further be desirable to provide a valid credential to the platform when an initial trusted device is installed and only when the trusted device is known to be validly bound to the system. It would further be desirable to provide a secure binding method that is tolerant of failure or removal during the binding process.

SUMMARY OF THE INVENTION

The objective of providing a secure mechanism for binding an initial trusted device or replacement device when no other device with the desired binding is present in the system is accomplished in a method and system. Portions of the method may be embodied in computer program products for execution on various processing systems associated with each portion.

The binding method includes generating binding information in a device by transferring a system-specific identifier into the device and combining it cryptographically with a device-specific key. The binding information is sent to another portion of the system and then upon each initialization of the device, the binding information is returned and the device can thereby verify that it is initializing in the system to which it is bound. The method also generates and transmits a proof of binding to a credential provider server, which then verifies that the binding is valid. Upon verifying the binding proof, the credential provider issues a new platform credential for the system. The old credential is invalidated upon receipt of an indication of the start of a new binding process and the binding must be completed and validated before the new platform credential is issued.

The objective of tolerance of failure during binding or attempts to thwart the binding process by removal or powering down is provided by placing the device in a "binding" state at commencement of binding and leaving the device in a "binding state" until the binding is validated, locking the device in the binding state if it is removed during the binding process, so that the device cannot be bound to another system. The scheme provides a one-way ratchet from the unbound state to the binding state to the bound state that cannot be reversed.

The foregoing and other objectives, features, and advantages of the invention will be apparent from the following, more particular description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
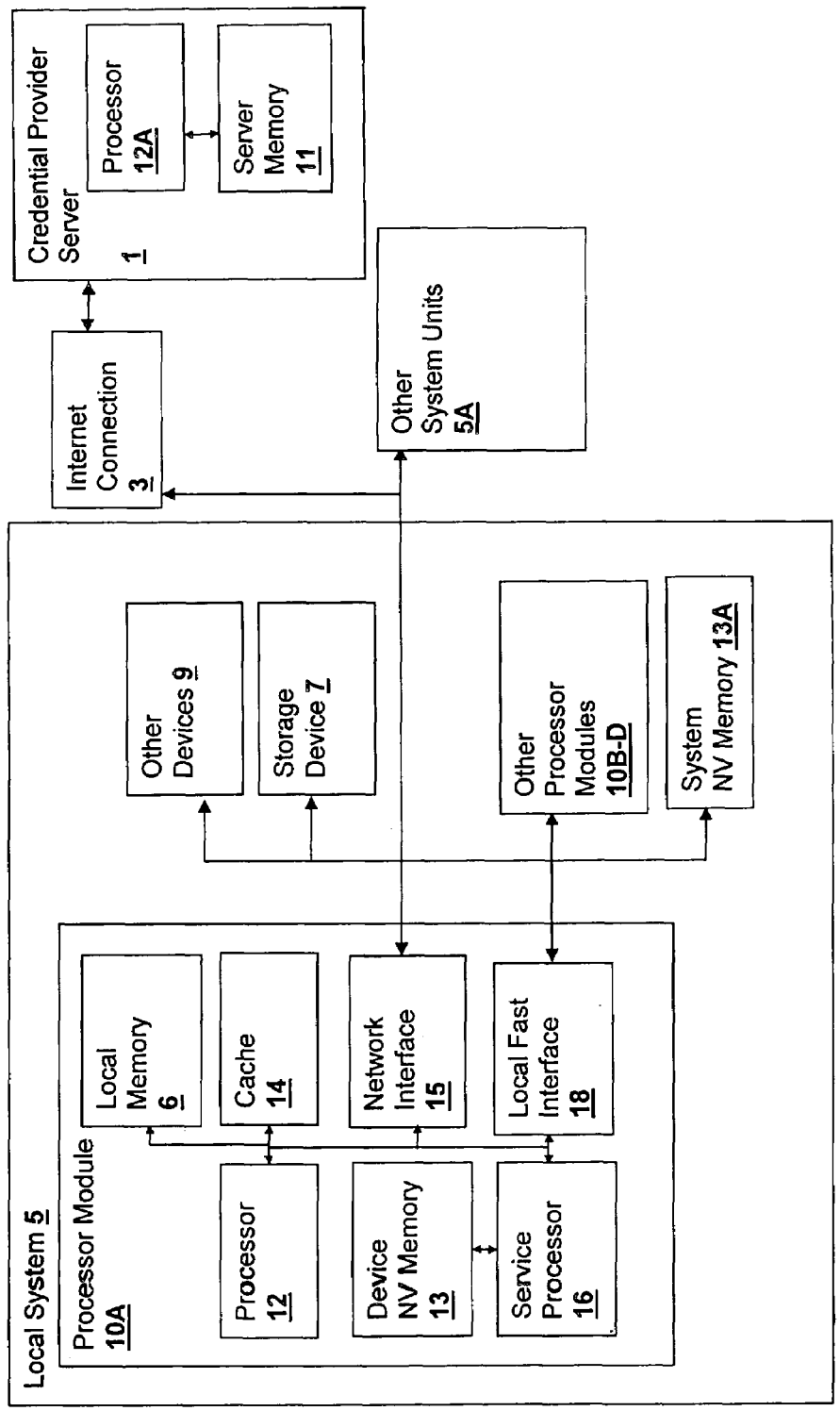
FIG. 1 is a block diagram of a computing system in which an embodiment of the invention is practiced.

With reference now to the figures, and in particular with reference to FIG. 1, there is depicted a block diagram of a system in which an embodiment of the present invention is practiced. It should be understood that the depicted embodiment is not intended to be limiting, but only exemplary of the type of processing system to which the methods and techniques of the present invention may be applied. The system includes a secured local system 5 having four processor modules (processor module 10A and three other identical processor modules 10B–D). Local system 5 may be connected to other system units 5A forming a super-scalar processing system. The local systems are connected to a credential provider server 1 via an Internet connection 3 or an alternative network interface. Credential provider server includes a processor 12A for executing server program instructions in accordance with an embodiment of the present invention and a server memory 11 for storing the program instructions and data.

Each processing module 10A, 10B–D includes a processor 12 for executing program instructions, a local memory 6 that is generally mapped as system memory accessible by other processor modules 10B–D and a cache 14 for storing data and program instructions. Processing modules 10A, 10B–D also each includes a non-volatile memory 13 that stores values used by the method of the present invention to verify that processor modules 10A, 10B–D are installed in the system to which they are bound. Processor modules 10A, 10B–D also each may include a service processor 16 which may carry out the security functions of the present invention, or alternatively processor 12 may perform the tasks described in further detail below. Processor modules 10A, 10B–D also include a local fast interface 18 for intercommunication with other modules in local system 5, and a network interface 15 for communication with other system units 5A and Internet connection 3. Local system also includes a storage device 7 as well as other devices 9, to which the binding techniques of the present invention may be applied. A system non-volatile memory 13A is also included for storing binding verification data and other system values associated with the security techniques of the present invention, such as the system serial number or other identifier.

Within system local memory 6, a virtual machine monitor program, or "hypervisor" provides support for execution of multiple virtual machines (VMs) or "partitions" that each provide an execution environment for an operating system and a number of "guest" programs (applications and services executed by an operating system and running in the associated VM).

In order to ensure security of the overall local system 5, as well as security as between multiple customers using local system 5 in instances where the above-mentioned partitions may belong to different customers requiring data protection as between the partitions, the present invention provides for binding of devices in local system 5 so that the devices can only be used in local system 5. As a result of the binding process, credential provider server 1 provides a credential to local system 5 that certifies to others that the system includes one or more trusted devices and therefore embodies the attributes associated with the trusted device. The certificate can then be used by other systems to verify that they can inter-operate with system 5 using the characteristics associated with a trusted platform device. The above-described arrangement is an illustration applicable to systems in which processor modules 10A, 10B–D are removable modules that may be inserted in or removed from local system 5 via a chassis or other interconnect arrangement. However, binding in the sense of the present invention may extend to other arrangements such as the networked interconnect illustrated between local system 5 and other system units 5A. The present invention uses encryption and public/private key pairs to secure binding-related communications between devices, and therefore security can be maintained in environments where the devices bound to a system may actually be located in physically disparate locations. However, shared symmetric keys may alternatively be employed.

Further, it should be understood that the techniques of the present invention apply not only to processor modules, but to any device for which it is useful to bind uniquely to a system and where verification of a credential is useful. For example, storage devices within a computer system could be bound to the system so that they will only operate with the system and a credential could be supplied in response to a query before an application or operating system routine trusts data stored on the device or trusts the device as a sink for data. Therefore, it should be understood that the following description, while referring for illustrative purposes to a binding of processor module 10A to local system 5 applies to binding of other devices and other systems, as well.

Figure 2:
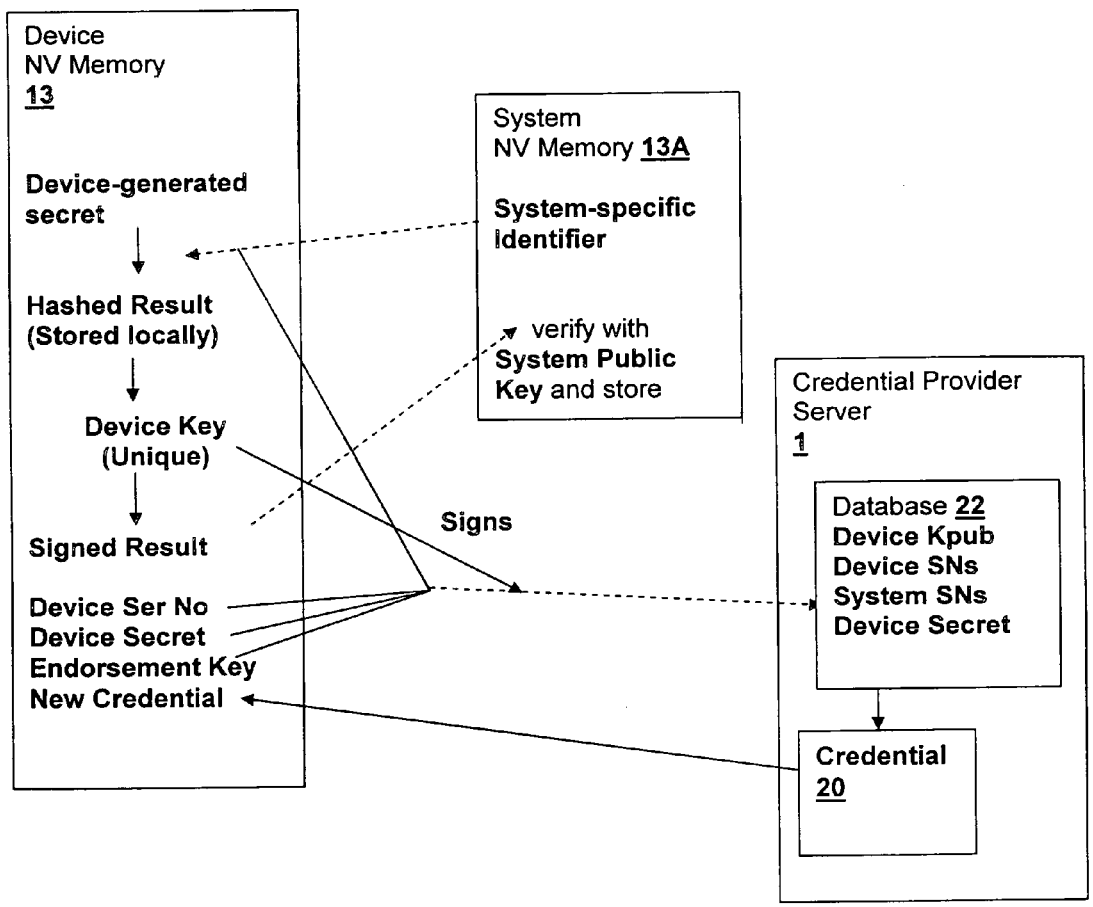
FIG. 2 is a block diagram of memory images and information flow within a system in accordance with an embodiment of the present invention.

Referring now to FIG. 2, a block diagram is shown depicting memory images and information flow within the computer system of FIG. 1. Within device non-volatile memory 13, a device specific identifier is stored, along with a unique device-specific key pair installed at the time of device manufacture.

During the binding process, processor module 10A generates a random bit sequence (the device-generated secret), which the device then hashes with a system-specific identifier provided by local system 5 to processor module 10A from system non-volatile memory 13A (or can be accessed from system non-volatile memory 13A directly by processor module 10A). The hashed result, the "platform binding record" (PBR) is stored in processor module 10A non-volatile memory 13 for future use in verifying that local system 5 is the system bound uniquely to processor module 10A. A private key unique to processor module 10A is used to sign the PBR and the signed PBR is sent to local system 5 where it is stored in system non-volatile memory 13A. Since only processor module 10A knows its unique private key, processor module can verify that local system 5 is the system to which it was bound upon subsequent return of the signed PBR to processor module 10A, as the signature on the signed PBR validates the signed PBR as having been generated by processor module 10A. Upon receipt of the PBR from processor module 10A, Llcal system 5 verifies the signed PBR using a system-unique public key provided by the manufacturer of processor module 10A and stores the signed PBR to return to processor module 10A for verification at initialization and other intervals as deemed necessary by the hypervisor.

Also during the binding process, a binding verification record is sent to credential provider server 1, which verifies that the system/device combination is valid and now properly bound. The binding verification record is verified using a device-specific public key retrieved from a database 22, which is indexed via the device identifier and system identifier. The binding verification record provides evidence that a particular device was bound to a system by including various information that can exist only in the device. In the illustrative embodiment, this is performed by using the device-specific private key to sign a hash of several pieces of information, including a device-specific public endorsement key, the system identifier provided during the binding process and a unique device identifier (generally the serial number). Before signing, the above information is hashed over a one-time use device secret (distinct from the one-time device generated secret) that was installed at the time of manufacture of the device. The one-time use device secret is then "burned" (erased) after the binding verification record is generated. This one-time secret is also stored in the manufacturer's (credential provider's) database, providing a verification that the device has been bound. The verification can only be performed once, as once the device has burned the one-time use secret, if the other one-way ratchets described below are overcome, binding of the device still cannot be verified without a binding verification record generated in conformity with the one-time use device secret.

The device-specific endorsement key is also unique to the initial trusted device and provides further verification that the device being bound is the correct device, as the endorsement key is also retained by the credential provider. The endorsement key is associated with the credential and is later used to show that the trusted platform virtual machines are running on a trusted platform device associated with a particular credential (which will contain the endorsement key as well).

Database 22 maintains public key information for all devices produced so that keys can be found to validate messages from devices, as well as the device one-time use secret. If the binding is validated, a credential 20 is generated and sent to processor module 10A, which stores it in device non-volatile memory 13 (which can include disk file storage) for use in identifying the platform provided by processor module 10A as a trusted platform having an identity certified by the credential provider (e.g., the manufacturer or other certification entity).

Since the unique private key is only stored within processor module 10A and is not retained by the manufacturer after injection of the private key into processor module 10A at the factory, nor stored anywhere else, it is extremely difficult for another device to impersonate processor module 10A during a binding process. It is therefore highly unlikely that a credential would be issued to any combination of devices and systems other than a known system and a known set of devices. Other techniques may be applied in addition to the above in order to further increase the difficulty.

Figure 3:
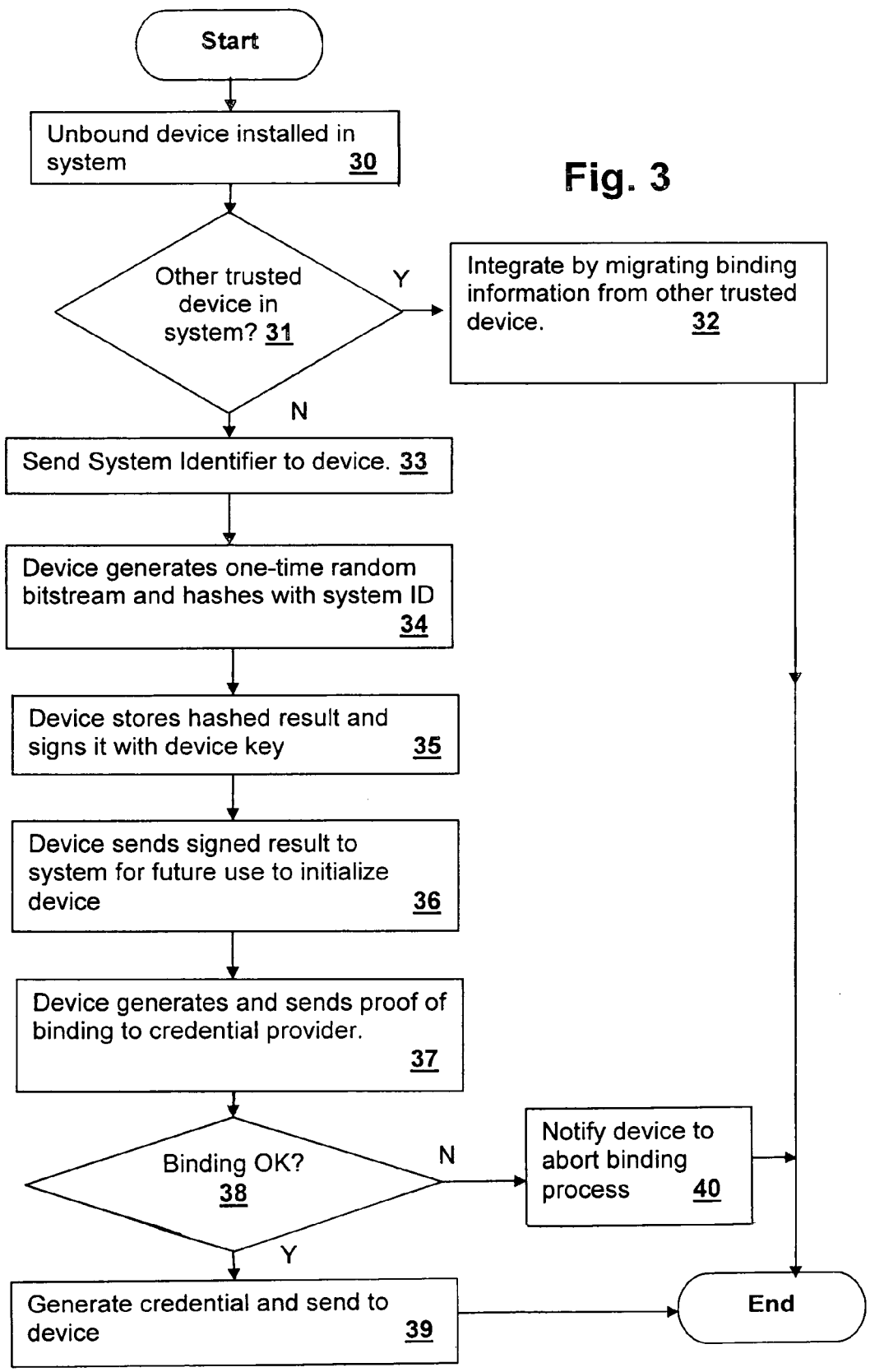
FIG. 3 is a flowchart depicting portions of a method in accordance with an embodiment of the present invention.

Referring now to FIG. 3, a portion of a method in accordance with an illustrated embodiment of the invention is depicted. When an unbound device is installed in (or coupled to) a system (step 30), if there is another trusted device in the system (decision 31) then an integration process is performed by migrating binding information from another trusted device (step 32). Essentially, the integration securely shares the hashed result (PBR) that was stored in the other device and stores it in the non-volatile memory 13 of the unbound device, which can then return a signed PBR to local system 5 for storage in system non-volatile memory 13A by signing the PBR from the other device with its own private key. When local system 5 sends the signed PBR to the newly-bound device at initialization time, the newly-bound device can verify the system in the same manner that the existing trusted device can. It should be noted that the unique private key of each device does not need to be exported, only the hashed result that was generated during binding of the existing trusted device.

However, if there is no other trusted device in the system (decision 31), then the method of the present invention is employed to bind the new device without performing the integration process of step 32. First, a system-specific identifier such as the system serial number is sent to the device (step 33). The device generates a random bit stream used as a secret value and hashes this value with the system-specific identifier to produce a hashed result (PBR) (step 34). The device stores the PBR and then signs the hashed result with the device's unique private key to provide a signed PBR (step 36) that is then sent to the system for use at each device initialization.

Proof of binding is also generated and is sent along with the system identifier to the credential provider (step 37). The credential provider determines whether or not the binding is valid (decision 38) by verifying the identity of the system and device as signatures within the signed proof of binding.

The credential provider has a public key for each device that is used to validate the signed proof of binding record and verify that it came from that particular device. As the system identifier is also part of the basis for the signed proof of binding, the identity of the system is also thereby identified, even though the device and system identifiers may also be sent "in the clear".

If the binding is valid (decision 38), then a credential is issued for the device and sent back to the system (step 39) so that the system can prove that it contains a trusted device. However, as explained above, it is not necessary for a credential to be sent to the system, and may be maintained on the credential provider server or stored at another location, as long as it is accessible to components needing to verify that the system contains a trusted device with certain attributes. But, if the binding is invalid (decision 38), then the device is notified to abort the binding process (step 40).

Figure 4:
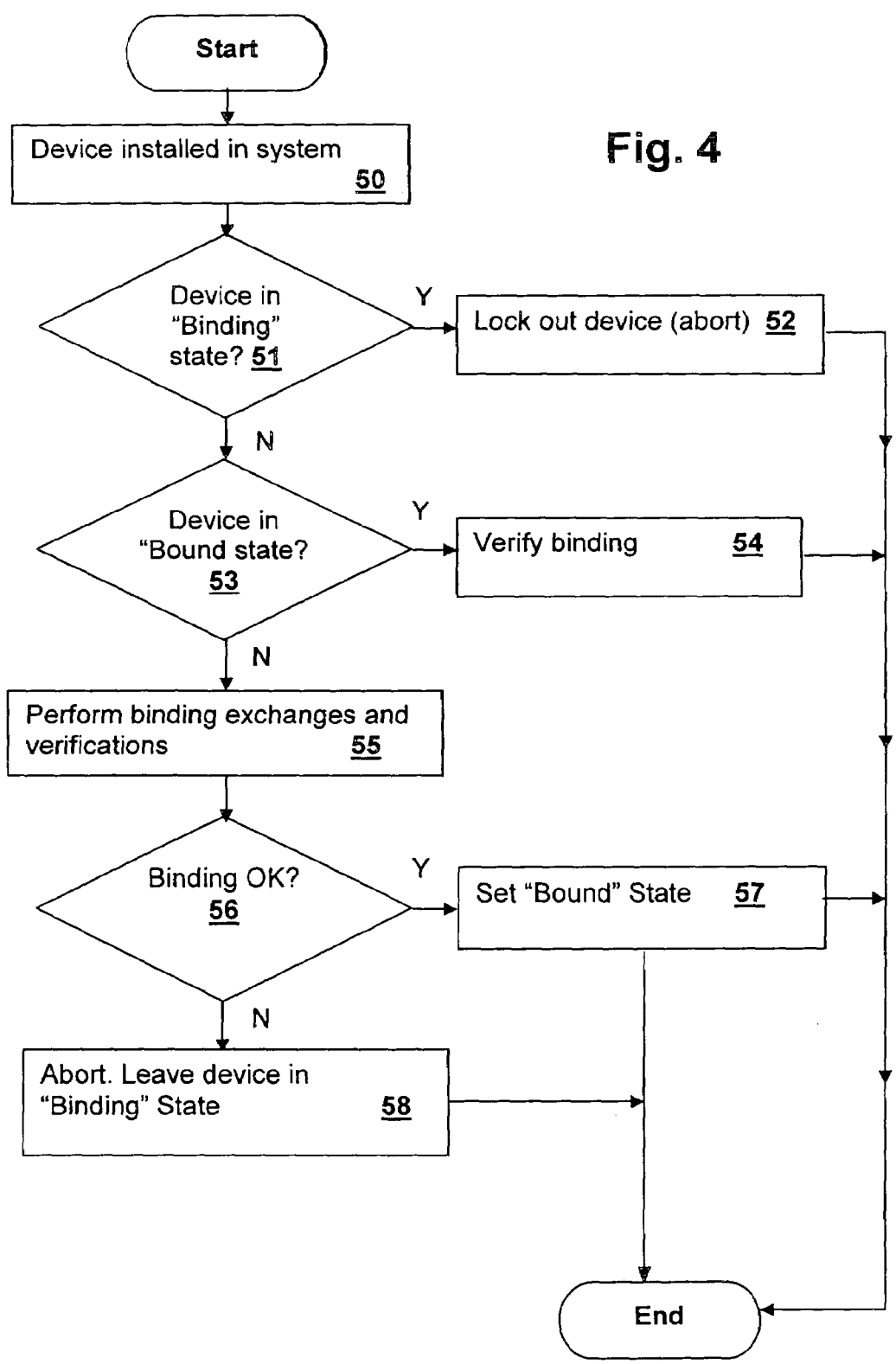
FIG. 4 is a flowchart depicting further portions of a method in accordance with an embodiment of the present invention.

Referring now to FIG. 4, another portion of the method in accordance with the illustrated embodiment of the invention is depicted. When a device is installed in the system (step 50), a state value is read from the device non-volatile memory (step 51). Three states are possible: "bound", "unbound" and "binding". The three states are employed in a one-way "ratchet" scheme that ensures that once the binding process is started on a device, the device can never return to an unbound state, and once binding is completed, the device can never return from the bound condition. If the device is in the "binding" state when the device is installed (decision 51) it is an indication that a binding process was interrupted in some manner and is an indication that tampering may have occurred by removal of the device during another binding process. So, if the device is in the binding state (decision 51) at installation, the device is locked out by the system (step 52) and must be returned to the manufacturer in order to be re-used. If the device is in the "bound" state (decision 53), then the binding is verified normally (step 54) and the device is initialized. If the device is in the "unbound" state (decision 53), the binding exchanges and verifications are performed (step 55) as exemplified by FIG. 3. If the binding is successful (decision 56) then the state of the device is set to the "bound" state (step 57), otherwise the device is left in the "binding" state (step 58), preventing further use of the device. Thus if any point in the binding process is interrupted, the device will be rendered useless until reprogrammed at the factory, preventing attempts to subvert the binding process by removal during installation.

Figure 5:
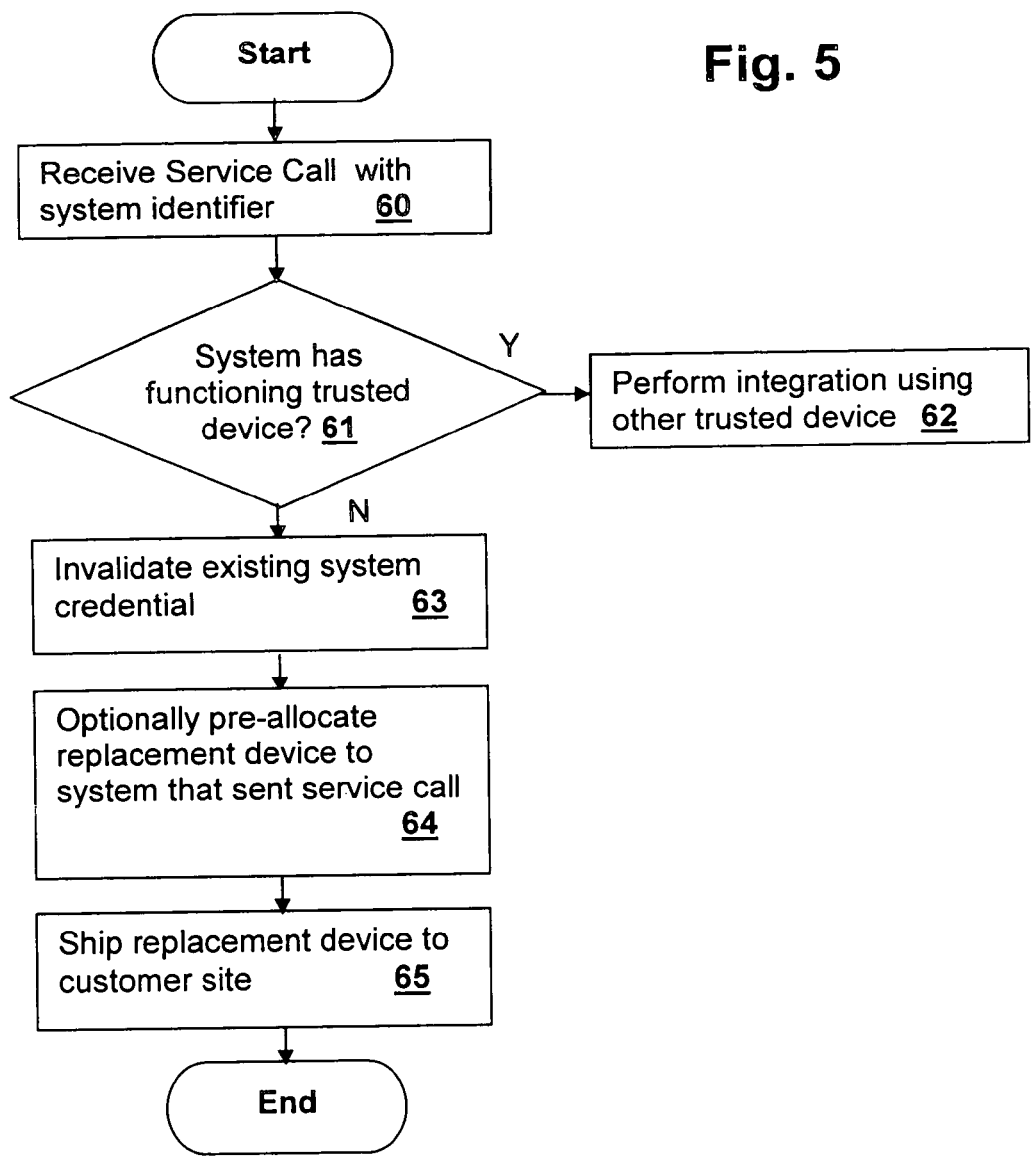
FIG. 5 is a flowchart depicting still further portions of a method in accordance with an embodiment of the present invention.

Referring now to FIG. 5, still another portion of the method in accordance with the illustrated embodiment of the invention is depicted. When failure of a trusted device occurs, a service call is received by the manufacturer (step 60). If the system has one functioning trusted device left (decision 61) the integration process mentioned above is performed on a replacement device using the trusted device (step 62). However, if no trusted devices are left functioning in the system (decision 61), then the system credential is invalidated (step 63) and a replacement device is optionally pre-bound to the system that sent the service call (step 64) and the replacement device is shipped to the customer site (step 65). The binding process described above is then performed as illustrated in FIGS. 3 and 4 once the replacement device is installed in the system. If the device is pre-bound to the system before shipment, then the verification of binding made by the credential provider server is made in conformity with a database entry that indicates that the replacement device is intended for installation in a particular system and will only issue a credential upon binding of the device to the correct system. The database contains information such as the device identifier, system identifier to which the device is assigned and the unique public keys associated with the system and the device.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of securing a processing system, said processing system including multiple devices that verify the identity of a particular processing system prior to initializing to a functioning state, said method comprising:
   first generating a binding of a given one of said devices to said processing system in conformity with system identifying information provided by said processing system and a first private information known only to said given device;
   second generating a proof of said binding in conformity with said system identifying information, a second private information known only to said given device, and a unique device identifier;
   transmitting said proof of binding from said processing system to a credential provider;
   determining at said credential provider whether or not said proof of binding indicates that said generated binding is valid; and
   in response to determining that said generated binding is valid, issuing a platform credential for said processing system.

2. The method of claim 1, wherein said second private information includes said first private information.

3. The method of claim 1, further comprising in response to receiving said proof of binding at said credential provider, invalidating an existing credential of said processing system.

4. The method of claim 1, further comprising transmitting said platform credential to said processing system.

5. The method of claim 1, further comprising storing said platform credential on a server, whereby authenticity and security of said processing system can be verified by accessing said platform credential on said server.

6. The method of claim 1, wherein said first generating comprises:
   hashing said system identifying information with a device-generated secret to produce a hashed result;
   signing said hashed result with a device-specific key to produce a signed result; and
   binding said given device to said particular system by sending said signed result to another portion of said processing system, whereby said given device will initialize only in said particular system in response to a return and verification of said signed result to said device.

7. The method of claim 6, wherein said second generating comprises:
   hashing a combination of at least said system identifying information and a unique device identifier; and
   signing a result of said hashing with a device-specific key to produce a signed result.

8. The method of claim 1, further comprising:
   setting a state of said given device to indicate a binding process is in progress prior to performing said binding;
   second receiving verification that said proof of binding has been verified by said credential provider;
   only in response to receiving said verification, setting said state to indicate said given device is bound.

9. The method of claim 1, further comprising:
second determining whether or not said system includes a functioning trusted device;
in response to determining that said system does not include a functioning trusted device, performing said first generating, second generating, transmitting, receiving, determining and issuing.

10. The method of claim 1, further comprising:
receiving at a server, a service request indicating that a predecessor of said given device has failed, and wherein said second determining is performed in response to receiving said service request at said server;
in response to determining that said system does not include a functioning trusted device, initiating shipment of said given device as a replacement for said predecessor; and
generating a service record associated with said given device within a database of said server.

11. The method of claim 10, wherein said determining whether or not said generated binding is valid is performed in conformity with information stored in said service record, whereby identity of said given device as said shipped device is verified prior to issuing said platform credential.

12. A system comprising:
a plurality of devices intercommunicating and constituting a processing system, said devices each including a memory for storing system program instructions and data and a processor for executing said system program instructions, and wherein said system program instructions include program instructions for
first generating a binding of a given one of said devices to said processing system in conformity with system identifying information provided by said processing system and a first private information known only to said given device,
second generating a proof of said binding in conformity with said system identifying information, a second private information known only to said given device, and a unique device identifier,
transmitting said proof of binding from said processing system to a credential provider; and
a credential provider server coupled via a network to said processing system, said credential provider server including a server processor for executing server program instructions and a memory for storing said sever program instructions, and wherein said server program instructions comprise program instructions for
receiving said proof of binding at said credential provider,
determining at said credential provider whether or not said proof of binding indicates that said generated binding is valid, and
in response to determining that said generated binding is valid, issuing a platform credential for said processing system.

13. The system of claim 12, wherein said second private information includes said first private information.

14. The system of claim 12, wherein said server program instructions further comprise program instructions for in response to said receiving, invalidating an existing credential of said processing system.

15. The system of claim 12, wherein said server program instructions further comprise program instructions for transmitting said platform credential to said processing system.

16. The system of claim 12, wherein said server program instructions further comprise program instructions for storing said platform credential on said server, whereby authenticity and security of said processing system can be verified by accessing said platform credential on said server.

17. The system of claim 12, wherein said system program instructions for first generating comprise program instructions for:
receiving in said given device, a system-specific identifier associated with a particular system;
hashing said system-specific identifier with a device-generated secret to produce a hashed result;
signing said hashed result with a device-specific key to produce a signed result; and
binding said given device to said particular system by sending said signed result to another portion of said processing system, whereby said given device will initialize only in said particular system in response to a return and verification of said signed result to said device.

18. The system of claim 17, wherein said system program instructions for second generating comprise program instructions for:
hashing a combination of at least said system identifying information and a unique device identifier; and
signing a result of said hashing with a device-specific key to produce a signed result.

19. The system of claim 12, wherein said system program instructions further comprise program instructions for:
setting a state of said given device to indicate a binding process is in progress prior to performing said binding;
second receiving verification that said proof of binding has been verified by said credential provider;
only in response to receiving said verification, setting said state to indicate said given device is bound.

20. The system of claim 12, wherein said system program instructions further comprise program instructions for:
second determining whether or not said system includes a functioning trusted device;
in response to determining that said system does not include a functioning trusted device, executing said system program instructions for first generating, second generating and transmitting.

21. The system of claim 20, wherein said server program instructions further comprise program instructions for:
second receiving at said server, a service request indicating that a predecessor of said given device has failed, and wherein said second determining is performed in response to said second receiving at said server;
in response to determining that said system does not include a functioning trusted device, initiating shipment of said given device as a replacement for said predecessor; and
generating a service record associated with said given device within a database of said server.

22. The system of claim 21, wherein said program instructions for determining determine whether or not said generated binding is valid in conformity with information stored in said service record, whereby identity of said given device as said shipped device is verified prior to issuing said platform credential.

23. A computer program product comprising signal-bearing media encoding server program instructions for execution within a server certifying security of a processing system that includes multiple secured devices, said server program instructions comprising program instructions for:
receiving from said processing system an signed result of a system-specific identifier and a device-specific identifier, signed by a device-specific key;

determining from said signed result, whether or not a valid binding of one of said multiple secured devices has been completed; and responsive to determining that a valid binding was accomplished, issuing a credential certifying said processing system as secured.

24. A computer program product comprising signal-bearing media encoding program instructions for execution within a processing system that includes multiple secured devices, said program instructions comprising program instructions for:

receiving in a given one of said devices, a system-specific identifier associated with a particular system;

generating binding information in conformity with information known only to said given device and said received system-specific identifier; and transmitting information in conformity with said generated binding information to a credential provider, whereby said binding may be validated contingent to issuing a valid platform credential for said processing system.

25. The computer program product of claim 24, wherein said program instructions further comprise program instructions for:

setting a state of said given device to indicate a binding process is in progress prior to performing said binding;

second receiving verification that said proof of binding has been verified by said credential provider;

only in response to receiving said verification, setting said state to indicate said given device is bound.

* * * * *